United States Patent [19]

Helmuth

[11] Patent Number: 4,864,611
[45] Date of Patent: Sep. 5, 1989

[54] TELEPHONE HANDSET ATTACHMENT FOR USE IN-THE-EAR HEARING AIDS

[76] Inventor: Keld T. Helmuth, 177 Caribe Isle, Novato, Calif. 94947

[21] Appl. No.: 124,973

[22] Filed: Nov. 24, 1987

[51] Int. Cl.⁴ .................. H04M 1/20; H04M 11/00
[52] U.S. Cl. ...................... 379/444; 379/52; 379/447; 379/450; 381/153; 381/158; 381/159; 381/161
[58] Field of Search ............... 379/444, 443, 447, 450, 379/433, 52; 381/158, 159, 161, 153, 68, 68.4; 181/160, 242

[56] References Cited

U.S. PATENT DOCUMENTS

| | | | |
|---|---|---|---|
| Re. 22,198 | 10/1942 | Loewe | 379/433 |
| T880,003 | 11/1970 | Spahn | 379/443 |
| 1,969,704 | 8/1934 | D'Alton | 181/160 |
| 2,544,027 | 3/1951 | King | 379/52 |
| 2,659,772 | 11/1953 | O'Hara | 379/52 |
| 2,714,134 | 7/1965 | Touger et al. | 381/159 |
| 2,847,506 | 8/1958 | Gray et al. | 381/68 |
| 3,246,721 | 4/1966 | Martin | 181/160 |
| 3,301,955 | 1/1967 | Clements, Jr. | 381/68 |
| 3,819,879 | 6/1974 | Boechtold | 381/158 |
| 4,252,996 | 2/1981 | D'Agostino | 379/443 |
| 4,596,899 | 6/1986 | Wojcik et al. | 381/68.4 |
| 4,689,818 | 8/1987 | Ammitzboll | 381/68 |
| 4,731,850 | 3/1988 | Levitt et al. | 381/68.2 |

FOREIGN PATENT DOCUMENTS

| | | | |
|---|---|---|---|
| 2545302 | 11/1984 | France | 381/153 |
| 219351 | 2/1985 | German Democratic Rep. | 379/433 |
| 225025 | 7/1985 | German Democratic Rep. | 181/242 |
| 43-29165 | 12/1968 | Japan | 381/153 |
| 1072314 | 6/1967 | United Kingdom | 381/159 |

OTHER PUBLICATIONS

Hallowell Davis, M.D., Hearing & Deafness–A Guide for Laymen, (New York: Murray Hill Books, 1947), pp. 193 and 252.
Hearing Instruments, "Telephone Earpad", Jan. 1985, p. 42.
Hearing Instruments, "Computer Hearing Aids Ad", May 1986, p. 24.
Hearing Instruments, "Telephone Coupler", Jun. 1986, p. 37.

Primary Examiner—Jin F. Ng
Assistant Examiner—Danita R. Byrd
Attorney, Agent, or Firm—Flehr, Hohbach, Test, Albritton & Herbert

[57] ABSTRACT

An attachment for a telephone handset used by users of in-the-ear hearing aids including a cup shaped member which acoustically couples the handset to the ear and serves to cancel feedback between the hearing aid receiver and microphone.

4 Claims, 2 Drawing Sheets

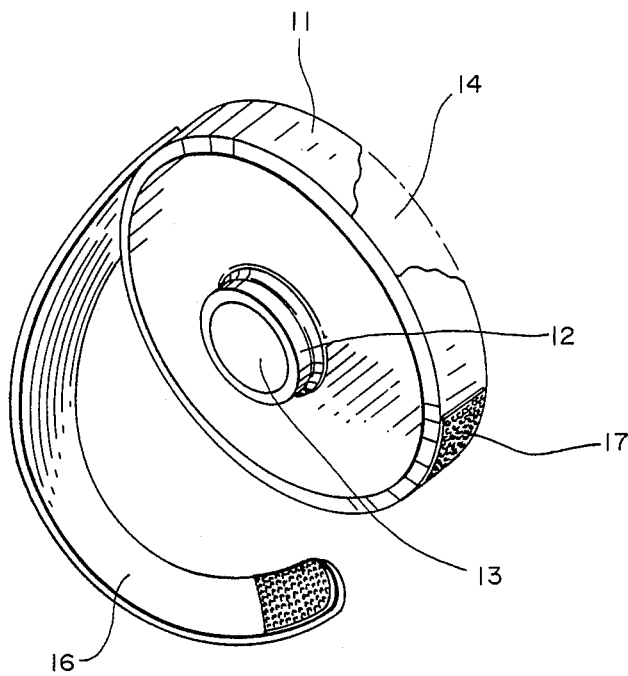
FIG.—1
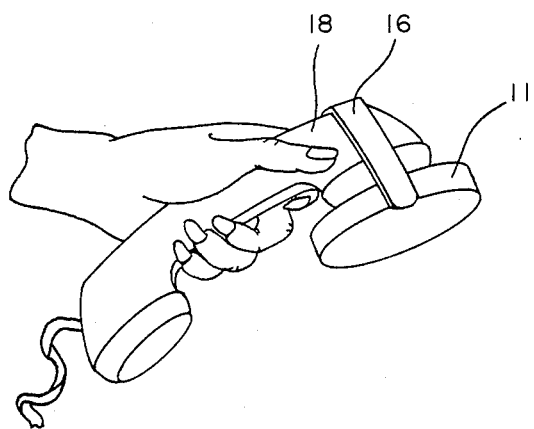
FIG.—2

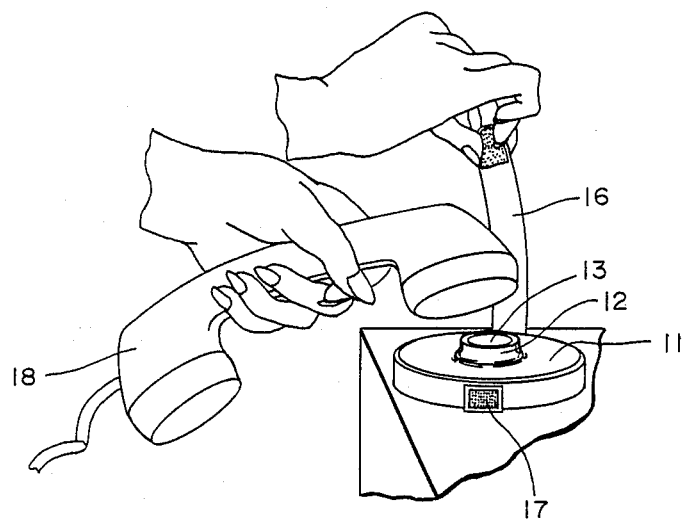
FIG.—3
FIG.—4

TELEPHONE HANDSET ATTACHMENT FOR USE IN-THE-EAR HEARING AIDS

This invention relates generally to a telephone handset attachment for use by individuals who use in-the-ear hearing aids.

Most all in-the-ear (ITE) hearing aid users have a problem when using any type of telephone on the ear in which they wear the ITE hearing aid. When the telephone receiver is placed on the ear, an acoustic cavity is formed with the walls of the cavity defined by the ear and the face of the telephone handset receiver. This acoustic cavity couples the hearing aid receiver output to the hearing aid microphone to provide acoustic feedback. This causes the hearing aid to go into acoustic oscillations at a frequency determined by the size of the cavity, primarily in the frequency range between 3,000–5,000 Hz, with harmonics at lower frequencies. During this oscillation (feedback) no sound level below the sound level of the acoustic feedback is amplified by the hearing aid. This makes it virtually impossible for the ITE hearing aid user to utilize the telephone on the ear where amplification at frequencies where hearing is impaired is needed.

Recently hearing aid circuits have been developed which include acoustic feedback control circuits. These circuits are mainly an external adjustment of the amplifier gain in the frequency range where feedback occur. These feedback circuits prevent the ITE hearing aid from going into acoustic feedback when normally worn and used. However, when used in connection with the telephone it does not prevent the hearing aid from creating the described acoustic feedback and oscillation.

It is an object of the present invention to provide a telephone attachment which introduces an acoustic cavity between the telephone receiver and the in-the-ear hearing aid to cancel the acoustic feedback between the hearing aid microphone and receiver.

The foregoing and other objects as achieved by an attachment which comprises a cup shaped housing having an open end adapted to fit over the ear of the user and a closed end including an opening. Means are provided for acoustically coupling the telephone receiver to the housing to permit sound to enter through the opening and means are also provided for attaching the housing to the handset whereby the telephone receiver can be coupled to the ear via the cup shaped housing which acts as an acoustic cavity resonating at the feedback frequency and acting to cancel feedback from the hearing aid receiver to the hearing aid microphone.

The invention will be more clearly understood from the following description taken in conjunction with the accompanying drawings of which:

FIG. 1 is a perspective view of a telephone handset attachment in accordance with the present invention.

FIG. 2 shows the telephone handset with attachment.

FIG. 3 shows the attachment being mounted on the telephone.

FIG. 4 shows the telephone hand set with attachment in use.

The attachment comprises an ear cavity shell or cup 11 made of any suitable material, preferably plastic, which includes a suitable compliant acoustic sealing material 12 for sealing the cup to the telephone receiver and an opening 13 providing acoustic communication between the telephone receiver and the interior of the cup. Preferably one or more pieces of acoustic foam 14 are held in the cup. A strap 16 has one end attached to the cup and its other end adapted to cooperate with the VelCro material 17 on the other side of the cup for attaching the handset coupler to the telephone handset 18 as shown particularly in FIG. 2.

The cavity shell 11 is designed and "tuned" so that it resonates in the frequency range in which the ITE hearing aid feedback occurs. The foam is placed in and fills up the shell cavity and its purpose is mainly to attenuate the harmonics created by the hearing aid's lower frequencies.

The shell cavity amplifies at the ITE hearing aid's feedback frequency and the amplified acoustic waves are directed towards the ear, they interfere with the feedback between the microphone and receiver and they form a standing wave. This cancels out the feedback signals. This enables amplification of the incoming signal from the handset enabling the user to hear the telephone converstion.

Thus, there has been provided a telephone attachment which enables a user of an in-the-ear hearing aid to use a telephone.

I claim:

1. A telephone attachment for in-the-ear hearing aid users to prevent feedback from the receiver to the microphone of the hearing aid when a telephone is placed on the ear comprising a cup shaped housing having an open end adapted to fit over the ear of the user and a closed end including an opening, means for acoustically coupling said opening to a telephone handset, means for detachably securing the housing to the handset whereby the telephone receiver can be coupled to the ear via the cup shaped housing, whereby said housing acts as an acoustic cavity to resonate at the hearing aid feedback frequency and acts to cancel feedback from the hearing air receiver to the hearing aid microphone.

2. A telephone attachment as in claim 1 wherein said means for detachably securing the housing to the handset comprises a strap having one end secured to the housing and its other end detachably secured to said housing.

3. A telephone attachment as in claim 1 including acoustic foam means housed in said housing.

4. A telephone attachment as in claim 1 in which said means for acoustically coupling said opening to a telephone handset comprises an acoustic compliant sealing material surrounding said opening and adapted to engage the telephone handset.

* * * * *